United States Patent [19]

Watanabe et al.

[11] Patent Number: 5,129,808
[45] Date of Patent: Jul. 14, 1992

[54] TWO-PLATE TYPE INJECTION APPARATUS

[75] Inventors: Kikuo Watanabe; Mitsuski Yoshioka, both of Yamanashi, Japan

[73] Assignee: Fanuc Ltd., Minamitsuru, Japan

[21] Appl. No.: 623,434
[22] PCT Filed: Apr. 27, 1990
[86] PCT No.: PCT/JP90/00566
    § 371 Date: Dec. 18, 1990
    § 102(e) Date: Dec. 18, 1990
[87] PCT Pub. No.: WO90/14206
    PCT Pub. Date: Nov. 29, 1990

[30] Foreign Application Priority Data

May 24, 1989 [JP] Japan .................. 1-128786

[51] Int. Cl.⁵ .................................... B29C 45/54
[52] U.S. Cl. ............................ 425/145; 425/587
[58] Field of Search ......... 425/145, 149, 171, 451.7, 425/590, 587

[56] References Cited

U.S. PATENT DOCUMENTS 4,380,427 4/1983 Hehl .......................... 425/590
4,693,676 9/1987 Inaba ......................... 425/145
4,781,568 11/1988 Inaba ........................ 425/451.7

FOREIGN PATENT DOCUMENTS 64-9714 1/1989 Japan.

*Primary Examiner*—Tim Heitbrink
*Attorney, Agent, or Firm*—Staas & Halsey

[57] ABSTRACT

A lightweight, compact, and low-cost two-plate type injection apparatus attached to an injection molding machine which includes an injection screw (50) spline-connected to a screw sleeve which is rotatably supported by a pusher plate (20) movable toward and away from a front plate (10). The screw is coupled through a transmission mechanism (62, 63) to a metering motor (160) which is fixed to the top face of the pusher plate so that the motor body is located above and between the two plates. First and second ball screws (91, 92), which are individually rotatably supported by the front plate, are threadedly engaged with first and second ball nuts, respectively, which are fixed to the pusher plate, and are coupled through a transmission mechanism (111 to 113) to an injection motor (140) which is fixed to the front plate so that the injection motor body is located above and between the front plate and the pusher plate and does not interfere with the metering motor body.

8 Claims, 2 Drawing Sheets

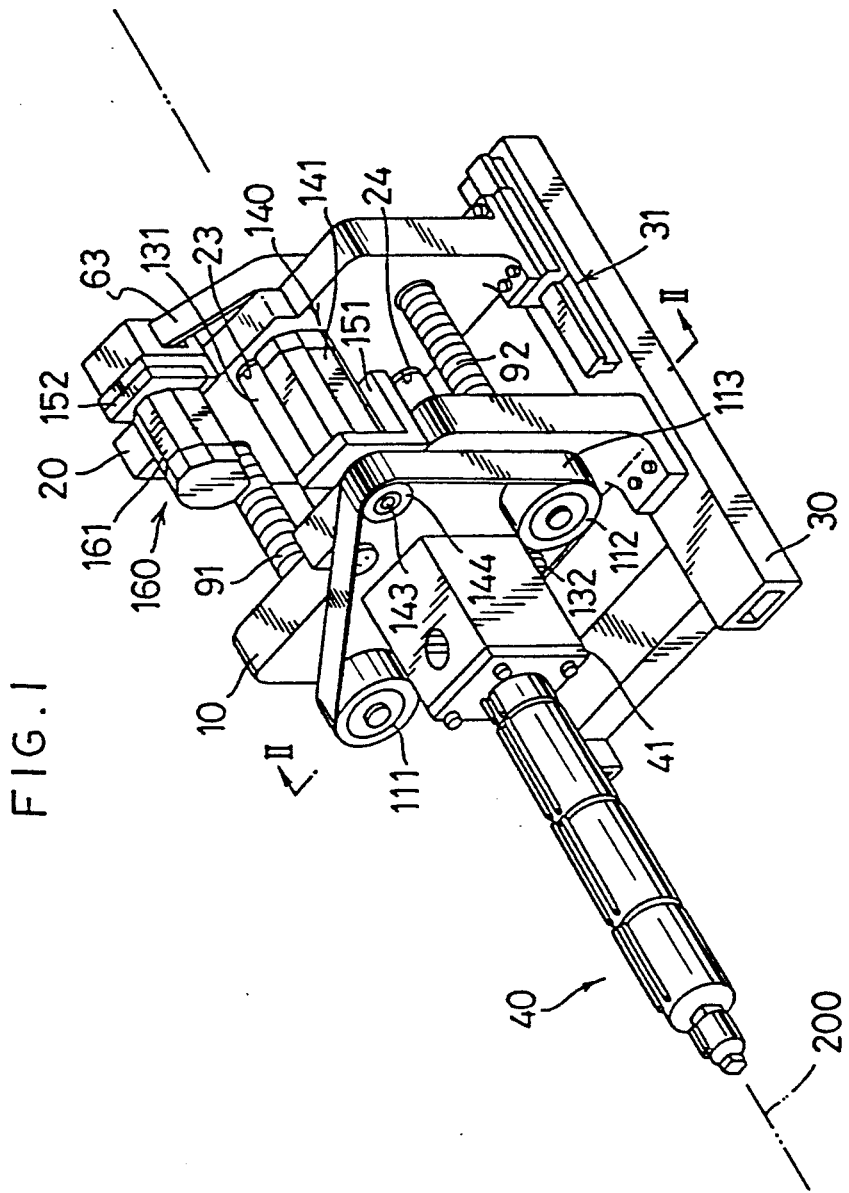

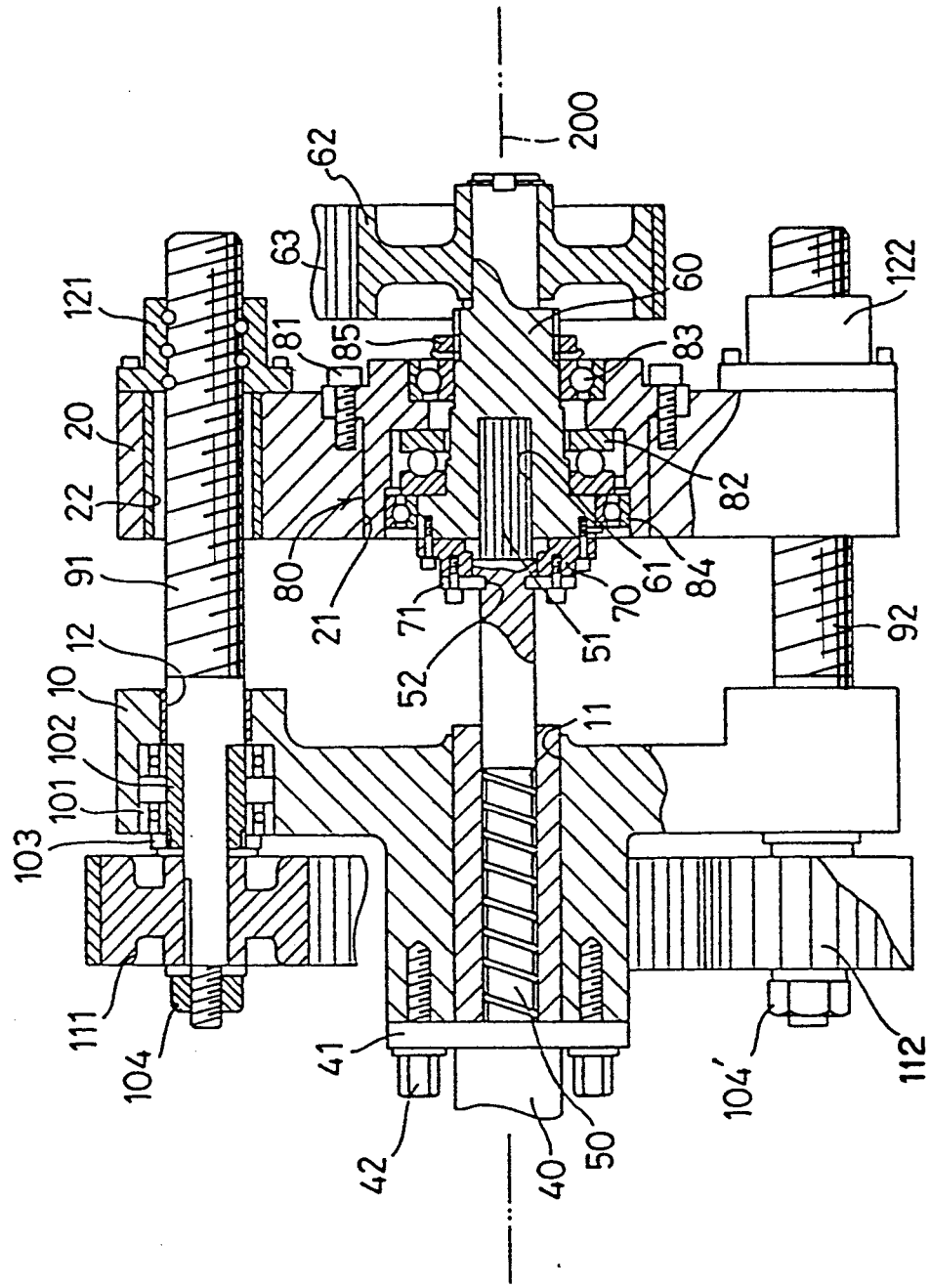

TWO-PLATE TYPE INJECTION APPARATUS

TECHNICAL FIELD

The present invention relates to an injection molding machine, and more particularly, to a two-plate type electrically-operated injection apparatus light in weight, compact, and low in cost.

BACKGROUND ART

In general, an injection molding machine is provided with a three-plate type injection apparatus which comprises front and rear plates and a pusher plate disposed between these two plates for reciprocation. The injection apparatus of this type needs a long distance between the front and rear plates, and includes an injection motor and a transmission mechanism operatively connecting the motor and the pusher plate, both the motor and the mechanism being located behind the rear plate. Accordingly, the three plate type injection apparatus requires a wide installation space, thus constituting a hindrance to the reduction in size of the injection molding machine.

DISCLOSURE OF THE INVENTION

The object of the present invention is to provide a two-plate type injection apparatus light in weight, compact, and low in cost.

In order to achieve the above object, a two-plate type injection apparatus according to the present invention comprises a front plate; a pusher plate movable toward and away from the front plate; an injection screw extending through the front plate and supported by the pusher plate so as to be rotatable and axially immovable relative to the pusher plate; a plurality of ball screws arranged parallel to the injection screw, rotatably supported by the front plate, and extending through the pusher plate, individually; a plurality of ball nuts fixed to the pusher plate and threadedly engaged with the plurality of ball screws, individually; an injection motor fixed to the front plate; a metering motor fixed to the pusher plate; a first transmission mechanism operatively coupling the injection motor and each of the plurality of ball screws; and a second transmission mechanism operatively coupling the metering motor and the injection screw.

According to the two-plate type injection apparatus of the present invention, as described above, the injection screw is supported by the pusher plate so as to be rotatable but axially immovable relative to the pusher plate. The ball screws are rotatably supported by the front plate, threadedly engaged with the ball nuts fixed to the pusher plate, and operatively couple to the injection motor through the first transmission mechanism. The metering motor is operatively coupled to the injection screw through the second transmission mechanism. Thus, a metering process can be executed by driving the metering motor to rotate the injection screw, which is coupled to the metering motor through the second transmission mechanism and rotatably supported by the pusher plate, and an injection process can be executed by driving the injection motor to rotate the ball screws, which are coupled to the injection motor through the first transmission mechanism and rotatably supported by the front plate, thereby linearly moving the injection screw supported so as to be relatively immovable in the axial direction by means of the pusher plate to which are fixed the ball nuts threadedly engaged with the ball screws, individually.

The injection apparatus of the present invention, unlike the three plate type injection apparatus, does not require use of a rear plate which is disposed at a distance from the front plate, and is designed so that the metering motor and the injection motor are fixed to the pusher plate and the front plate, respectively. Accordingly, the installation space of the injection apparatus, especially the axial length thereof, can be reduced, so that the injection apparatus can be made compact. Since the rear plate and its associated parts are not needed, moreover, the number of components of the injection apparatus can be reduced, thus permitting reduction in weight and cost of the injection apparatus.

BRIEF DESCRIPTION OF THE DRAWINGS

FIG. 1 is a schematic perspective view showing an injection apparatus according to one embodiment of the present invention; and FIG. 2 is an enlarged horizontal sectional view taken along line II—II of FIG. 1.

BEST MODE OF CARRYING OUT THE INVENTION

Referring to FIGS. 1 and 2, a two-plate type electrically-operated injection apparatus according to one embodiment of the present invention, adapted to be mounted on an injection molding machine, comprises a front plate 10 and a pusher plate 20. The front plate 10 is fixed on a machine base 30, and the pusher plate 20 is disposed parallel to the front plate 10 so as to be movable toward and away from the front plate 10 along linear guides 31 fixed on the machine base 30.

A proximal-end-side flange 41 of a heating cylinder 40, which is aligned with an injection axis 200, is fixed to the front end face of the front plate 10 by means of bolts 42. An injection screw 50, which is disposed in the heating cylinder 40 so as to be axially movable and rotatable and aligned with the injection axis 200, has an intermediate portion thereof extending through a through hole 11 formed in the central portion of the front plate 10. A spline shaft 51, which constitutes the rear end portion of the screw 50, is fitted in a shaft hole 61 which is bored through a screw sleeve 60 so as to be in alignment with the hole 11 of the front plate 10 and has spline grooves formed on its inner peripheral surface. An annular groove 52 is formed on the outer peripheral surface of the screw 50, and a pair of half shaft retainers 71, which are individually removably fitted in the annular groove 52, are fixed individually to the front end face of a ring-shaped load cell 70 which is fixed to the front end face of the screw sleeve 60. Thus, the injection screw 50 is axially movable and rotatable in unison with the screw sleeve 60.

Reference numeral 80 denotes a bearing housing, which is fitted in a large-diameter through hole 21 which is formed in the central portion of the pusher plate 20 so as to extend axially in alignment with the through hole 11 of the front plate 10. The bearing housing 80, which is fixed, at its flange on the rear end face side thereof, to the rear end face of the pusher plate 20 by means of bolts 81, supports the screw sleeve 60 for rotation by means of a thrust bearing 82, an angular bearing 83, and a radial bearing 84, and also supports the sleeve by means of a clamp ring 85 so that the sleeve is immovable in the axial direction, with respect to the housing and the pusher plate.

First and second ball screws 91 and 92 are arranged on either side of the injection screw 50 with respect to the width direction of the injection apparatus, individually extending parallel to the screw. The first ball screw 91 extends through an axial hole 12, which is formed at one side edge portion of the front plate 10, and an axial hole 22 which is formed in the pusher plate 20 so as to be in alignment with the axial hole 12. An intermediate portion of the screw 91 is rotatably supported by the front plate 10 with the aid of an angular bearing 101 and a sleeve 102. The bearing 101 is fixedly retained by means of a bearing retainer 103 which is threadedly engaged with a thread portion formed on the outer peripheral surface of the front end portion of the sleeve 102. A first driven pulley 111, which is located on the front end face side of the front plate 10, is fixed to the front end portion of the first ball screw 91 for rotation integral therewith by means of a nut 104 threadedly engaged with a distal thread portion of the first ball screw. The nut 104, in conjunction with a suitable member (not shown), supports the first ball screw 91 so as to be axially immovable relative to the front plate 10. Further, the intermediate portion of the first ball screw 91 is loosely passed through the through hole 22 of the pusher plate 20, and a ball nut 121, which is threadedly engaged with the rear end portion of the first ball screw, is fixed to the rear end face of the pusher plate 20.

The second ball screw 92, which extends through those through holes at the other side edge portions of the front plate 10 and the pusher plate 20, and its peripheral elements are arranged in the same manner as in the case of the first ball screw 91, and a description of the arrangement is omitted. Reference numerals 112 and 122 denote a second driven pulley and a second ball nut threadedly engaged with the second ball screw 92, respectively, and 104' denotes an element corresponding to the nut 104.

Guide holes (not shown) are axially formed individually in the upper and lower edge portions of the front plate 10, and guide holes 23 and 24 are individually axially formed in the pusher plate 20 so as to be in alignment with the two guide holes in the front plate. A first guide bar 131, which extends through the guide holes in the respective upper edge portions of the plates 10 and 20, and a second guide bar 132, which extends through the guide holes in the respective lower edge portions of the two plates, are arranged in alignment with the injection screw 50 with respect to the width direction of the injection apparatus, individually extending parallel to the screw 50 and the ball screws 91 and 92. The respective front end portions of the two guide bars 131 and 132 are securely supported by means of the front plate 10.

Reference numeral 140 denotes an injection servomotor which is fixed to the top face of the front plate 10 by means of a bracket 151. The motor 140 is arranged so that its body 141 is situated above and between the front plate 10 and the pusher plate 20, whereby the axial length of the injection apparatus is reduced. A driving pulley 144, which is located on the front end side of the front plate 10, is mounted on an output shaft 143 of the servomotor 140 so as to be rotatable integrally with the motor output shaft. A timing belt 113 is passed around the driving pulley 144 and the first and second driven pulleys 111 and 112, thus constituting a first transmission mechanism in conjunction with these pulleys. In this arrangement, the servomotor 140 is operatively coupled to the first and second ball screws 91 and 92 through the first transmission mechanism.

A metering servomotor 160 is fixed to the top face of the pusher plate 20 by means of a bracket 152. The servomotor 160 is arranged so that its body 161 is situated above and between the front plate 10 and the pusher plate 20, and the motor body 161 is located in a position, with respect to the width direction of the pusher plate, such that it does not interfere with the injection motor body 141. By this arrangement, the axial length of the injection apparatus is reduced. The metering servomotor 160 is operatively coupled to the screw sleeve 60 by means of a second transmission mechanism, which is composed of a driving pulley (not shown) fixed to an output shaft (not shown) of the servomotor 160 and located on the rear end face side of the pusher plate 20, a driven pulley 62 fixed to the outer end of the screw sleeve 60, and a timing belt 63 passed around both these pulleys.

The following is a description of the injection apparatus constructed in the above manner.

When the metering motor 160 is rotated under the control of a conventional control device attached to the injection molding machine, the rotatory force of the driving pulley fixed to the motor output shaft is transmitted through the timing belt 63 to the driven pulley 62, so that the pulley 62 rotates. Accompanying this pulley rotation, the screw sleeve 60, which is rotatably supported by the pusher plate 20 through the bearing housing 80 and the like, and the injection screw 50 rotatable integrally therewith, are caused to rotate. Accompanying the screw rotation, resin material in the heating cylinder 40 melts, and a pressure produced by the molten resin acts on the injection screw 50. The injection screw 50 and the pusher plate 20, which is movable integrally therewith in the axial direction, move backward while rotating the first and second ball screws 91 and 92, which are threadedly engaged with the first and second ball nuts 121 and 122, respectively, fixed to the plate 20, and are rotatably supported by the front plate 10. While moving backward in this manner, the pusher plate 20 is guided by the ball screws 91 and 92, the guide bars 131 and 132, and the linear guides 31, whereby the parallel relation between the front plate 10 and the pusher plate 20 can be maintained. Accordingly, the injection screw 50 cannot be deviated from the injection axis 200. While the injection screw is moving backward, as is conventionally known, the injection motor 140 is controlled so as to produce a required rotation torque, so that a required back pressure is applied to the screw 50. The control device controls the back pressure on the screw 50 in accordance with an output signal, supplied from the load cell 70 and indicative of the molten resin pressure, and the like.

When the metering process is finished, thereafter, the rotation of the metering motor 160 is stopped, while the injection motor 140 starts to be rotated. As the motor rotates, the rotary force of the driving pulley 144, fixed to the motor output shaft 143, is transmitted through the timing belt 113 to the first and second driven pulleys 111 and 112, so both these pulleys rotate. As the pulleys rotate, the first and second ball screws 91 and 92 rotate, so that the pusher plate 20, which is movable integrally with the first and second ball nuts 121 and 122 threadedly engaged with the two ball screws, the injection screw 50 movable integrally with the plate, and the screw sleeve 60 move forward thereby executing an injection process. Also during the forward movement, the parallel relation between the front plate 10 and the pusher plate 20 can be maintained for the same reason as in the case of the backward movement, and the injection screw 50 can be prevented from being deviated from the injection axis 200. The control device controls the injection pressure in accordance with an output signal, supplied from the load cell 70 and indicative of the injection pressure, and the like.

The present invention is not limited to the embodiment described above, and various modifications may be effected therein.

In the above embodiment, for example, the pair of ball screws are arranged on either side of the injection apparatus with respect to the width direction thereof, and the pair of guide bars are arranged individually on the upper and lower sides of the injection apparatus, with respect to the height direction thereof, so as to be in alignment with the injection axis with respect to the width direction of the apparatus. However, the numbers of ball screws and guide bars and the their locations in the injection apparatus can be changed variously. Further, the linear guides and guide bars attached to the injection apparatus of the embodiment are not indispensable, so that they may be omitted.

We claim:

1. A two-plate injection apparatus comprising:
   a front plate;
   a pusher plate movable toward and away from said front plate;
   an injection screw extending at a first end through said front plate and being rotatably supported at a second opposite end by said pusher plate so as to be rotatable therein while still being axially immovable relative to said pusher plate;
   a plurality of ball screws arranged parallel to said injection screw, each of said ball screws being rotatably supported by said front plate, and extending through said pusher plate;
   a plurality of ball nuts fixed to said pusher plate, each of said ball nuts being threadedly engaged with one of said ball screws;
   an injection motor fixedly mounted on said front plate;
   a metering motor fixedly mounted on said pusher plate;
   a first transmission mechanism operatively coupling said injection motor to each of said ball screws; and
   a second transmission mechanism operatively coupling said metering motor to said injection screw.

2. A two-plate injection apparatus according to claim 1, wherein said injection motor is arranged so that a motor body thereof is situated between said front plate and said pusher plate.

3. A two-plate injection apparatus according to claim 2, wherein said first transmission mechanism is disposed on a front end face side of said front plate.

4. A two-plate injection apparatus according to claim 1, wherein said metering motor is arranged so that a motor body thereof is situated between said front plate and said pusher plate.

5. A two-plate injection apparatus according to claim 4, wherein said second transmission mechanism is disposed on a rear end face side of said pusher plate.

6. A two-plate injection apparatus according to claim 1, wherein said injection motor and said metering motor are fixed to respective top faces of said front plate and said pusher plate, respectively, so that respective motor bodies of said two motors are situated above and between said front plate and said pusher plate and that no interference is caused between said two motor bodies, and said first and second transmission mechanisms are arranged on a front end face side of said front plate and a rear end face side of said pusher plate, respectively.

7. A two-plate injection apparatus according to claim 1, further including:
   at least one guide bar disposed parallel to said injection screw, supported by said front plate, and extending through said pusher plate.

8. A two-plate injection apparatus according to claim 1, further including:
   a machine base having a linear guide for guiding said pusher plate and;
   wherein said front plate is fixed to said machine base.

* * * * *

UNITED STATES PATENT AND TRADEMARK OFFICE
CERTIFICATE OF CORRECTION

PATENT NO. : 5,129,808
DATED : July 14, 1992
INVENTOR(S) : KIKUO WATANABE and MITSUSHI YOSHIOKA It is certified that error appears in the above-identified patent and that said Letters Patent is hereby corrected as shown below:

Title page, [75] Inventor: "Mitsuski" should be --Mitsushi--.

Column 1, line 21, "three plate" should be --three-plate; and line 54, "couple" should be --coupled--.

Column 2, line 3, "three plate" should be --three-plate--.

Column 4, line 67, after "forward" insert a comma --,--.

Column 6, line 41, "and;" should be --; and--.

Signed and Sealed this

Nineteenth Day of October, 1993

Attest:

BRUCE LEHMAN

Attesting Officer   Commissioner of Patents and Trademarks